No. 833,380.
PATENTED OCT. 16, 1906.
H. M. FOULK.
OSCILLATING SUPPORTING DEVICE FOR VEHICLES.
APPLICATION FILED SEPT. 25, 1905.
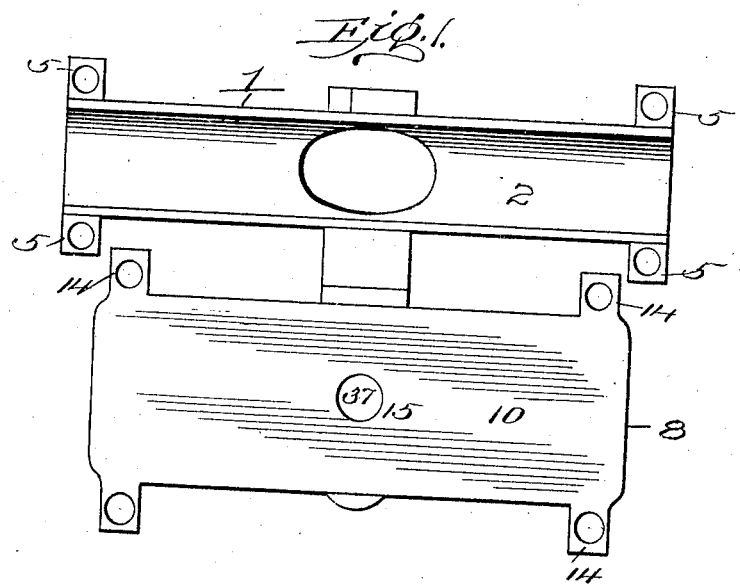
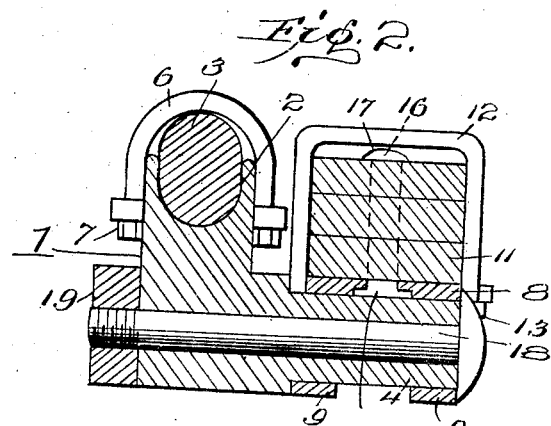
Witnesses
J. M. Fowler Jr
E. E. Vrooman.
Inventor
Horace M. Foulk
By Mason, Fenwick & Lawrence
Attorneys

UNITED STATES PATENT OFFICE.

HORACE M. FOULK, OF OSHKOSH, WISCONSIN.

OSCILLATING SUPPORTING DEVICE FOR VEHICLES.

No. 833,380.　　　Specification of Letters Patent.　　　Patented Oct. 16, 1906.

Original application filed May 25, 1905, Serial No. 262,251. Divided and this application filed September 25, 1905. Serial No. 280,063.

*To all whom it may concern:*

Be it known that I, HORACE M. FOULK, a citizen of the United States, residing at Oshkosh, in the county of Winnebago and State of Wisconsin, have invented certain new and useful Improvements in Oscillating Supporting Devices for Vehicles; and I do hereby declare the following to be a full, clear, and exact description of the invention, such as will enable others skilled in the art to which it appertains to make and use the same.

This invention relates to improvements in vehicles, and particularly to means for supporting the body upon the springs thereof.

The object of the invention is the improvement of a hanger device which movably secures the body to the springs.

With this and other objects in view the invention consists of certain other novel constructions, combinations, and arrangements of parts, as will be hereinafter fully described, illustrated in the accompanying drawings, and more particularly pointed out in the claims hereto appended.

In the drawings, Figure 1 is a top plan view of a hanger device constructed in accordance with the present invention. Fig. 2 is a transverse central sectional view of the same as it appears when applied to a vehicle. Fig. 3 is a fragmentary perspective view of the running-gear of a vehicle and showing the application of my invention thereto.

Referring to the drawings by reference-numerals, 1 designates the oscillating member, which is provided with a longitudinal recess or way 2, in which is normally seated the body-hanger 3. The oscillating member 1 is provided with a tubular boss or extension 4. A pair of apertured lugs or ears 5 is formed at each end of the oscillating member 1, within which are positioned clips 6, which secure the oscillating member to the body-hanger 3 through the medium of the fastening means, preferably nuts 7.

A spring supporting member 8 is positioned upon the boss or tubular extension 4 of the oscillating body-hanger engaging member 1, said member 8 being provided with portions 9 9, which inclose the boss or tubular extension 4 of the oscillating member 1. The spring engaging member 8, which is provided with a flat upper surface 10, is engaged by spring 11 when the hanger device is secured thereto. The hanger device is preferably secured to the spring 11 through the medium of clips 12. The clips 12 are provided with nuts 13. The clips 12 are positioned within apertured integral lugs or ears 14. The spring engaging member 8 is provided with a suitable head-receiving apertured portion 15, which is formed for receiving a bolt 16. The head of the bolt 16 is positioned within the apertured portion 15 and the bolt passes through the spring 11. The outer end of the bolt 16 is preferably flattened at 17 for securing said bolt and the spring engaging member 8 in a fixed position upon the spring 11. The spring engaging member 8 and the oscillating member 1 are removably secured together by means of an ordinary bolt 18, upon one end of which is threaded a nut 19.

While the oscillating member is preferably clipped to the vehicle, I do not, however, wish to confine my invention to this means of attaching, as ears may be constructed upon each side of the member 1 and rivets passed transversely through the ears and the body-hanger 3.

The oscillating device may be cast in two parts of malleable iron and may be adapted for use either above or below the spring and either above or below the body-hanger.

This application is a division from my application relating to improvements in running-gears for vehicles filed May 25, 1905, Serial No. 262,251.

What I claim is—

1. A device of the character described, comprising an oscillating member provided with an integral, right-angled, tubular boss, said oscillating member provided with a way formed in its upper portion, a spring supporting member positioned upon and surrounding said boss, and removable fastening means for securing said oscillating and spring supporting members together.

2. A device of the character described, comprising an oscillating member provided with a tubular, reduced portion extending at right angles therefrom, said member having a groove or way formed in its upper portion, apertured lugs formed upon said oscillating member, removable fastening means engaging said lugs, a spring supporting member carried by said tubular, reduced portion, said spring supporting member provided with means inclosing said tubular portion, said spring supporting member provided with a flat, upper face and an aperture, apertured lugs carried by said spring supporting member, and means for securing said oscillating and spring supporting members together.

In testimony whereof I affix my signature in presence of two witnesses.

HORACE M. FOULK.

Witnesses:
 LULU KELLOGG,
 RICH. A. WEBER.